Feb. 25, 1964 G. E. FRYER 3,122,636
METHOD AND APPARATUS FOR CALIBRATION OF WELL LOGGING APPARATUS
Filed Dec. 23, 1958 3 Sheets-Sheet 1

INVENTOR
Glenn E. Fryer
BY
Burns, Doane, Benedict & Irons
ATTORNEYS

INVENTOR
Glenn E. Fryer
BY
Burns, Doane, Benedict & Irons
ATTORNEYS

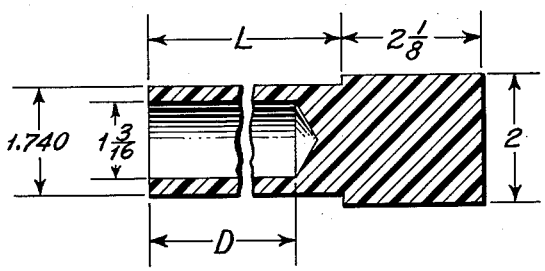
Fig.5.
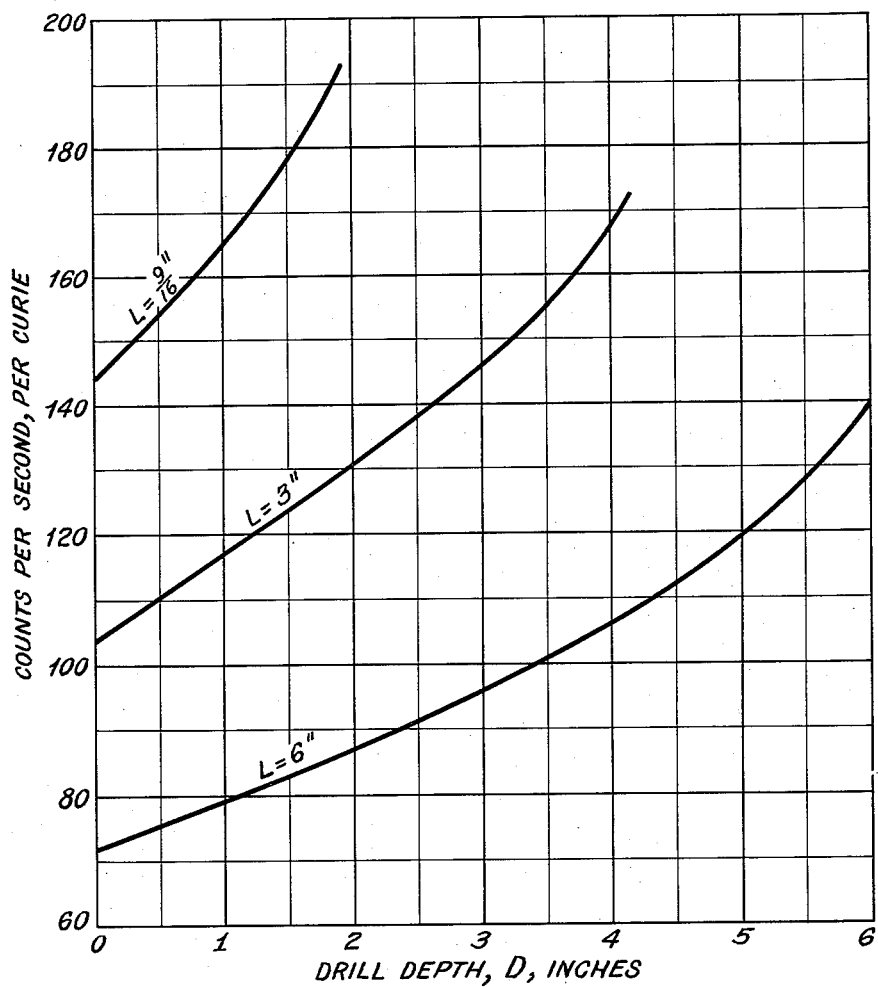
INVENTOR
Glenn E. Fryer

United States Patent Office 3,122,636
Patented Feb. 25, 1964

3,122,636
METHOD AND APPARATUS FOR CALIBRATION OF WELL LOGGING APPARATUS
Glenn E. Fryer, Houston, Tex., assignor to Great Lakes Carbon Corporation, New York, N.Y., a corporation of Delaware
Filed Dec. 23, 1958, Ser. No. 782,528
9 Claims. (Cl. 250—83)

This invention relates to radiation well logging and, more particularly, to a method and apparatus for calibrating a neutron well logging system.

During the past 15 years the well-known radiation well logging system has become a very effective and widely used tool in exploration for gas and oil. One of the most useful types of logs is obtained by running a neutron source and radiation detector through the formations surrounding a borehhole, thereby obtaining from the recorded response of the detector indications of the varying porosity of the various formations. It is desirable to be able to interpret the relative amplitudes of the recorded detector response to mean definite different percentages of porosity of the formations, and for this purpose, it is essential that the indications of the log be very accurate.

The log obtained from a neutron logging system, however, may vary in accordance with several characteristics other than the porosity of the formations traversed by the sonde. For instance, the response of the detector during its useful life may vary with age and with other changes peculiar to the type of detector employed. Further, the various vacuum tubes or other dynamic elements connected between the neutron detector and the log recording apparatus may have their characteristics changed over their useful life. Also, the intensity of radiation from the neutron source may vary, especially if the neutron source is of a relatively short half-life. Each of these types of changes will cause differences in indications on the log which are not in any manner related to the porosity of the formations being logged.

In order to avoid changes in indication caused by such factors as those enumerated above, and other factors not mentioned, it is very desirable to calibrate the logging system so that the indication obtained will be independent of variations not related to the changes in formations. Further, as indicated above, it is desirable to be able to read from the log the percentage of porosity of the formations traversed by the sonde, with any variation in percentage determined only by change in porosity.

The various calibration methods employed in the past have not been wholly satisfactory for their intended purposes. For instance, it has been suggested that the logging system be calibrated with a standard source having a known intensity and known spectrum of radiation, which source is positioned externally of the sonde. Since the standard source is not necessarily of the same characteristics as the source used in logging operations, however, calibrations obtained in this manner are not necessarily accurate. It has also been poposed to place the entire logging sonde within a body of radiation absorbing or radiation-interactive material which has a known absorbing characteristic, such as to simulate a well formation. Unfortunately, this method requires the use of external apparatus which is relatively bulky and inconvenient to carry around on well logging operations, and it is very difficult to make such a radiation-absorbing body of precisely the desired absorption characteristics.

The method and apparatus of the present invention are designed to avoid the difficulties and deficiencies of the prior calibration methods by use of the logging radiation source for calibration, and by elimination of the need of any external radiation-absorbing body for calibration.

In the usual neutron logging sonde, the neutron source is separated from the neutron detector by what might be termed a radiation shield, which is actually a body of radiation-absorbing material of length and characteristics such as to prevent direct radiation from the source from having any appreciable effect upon the detector response. The method of the present invention involves replacement of this shield with an absorber which absorbs a portion only of the radiation due to the source, so that a definite percentage of the radiation emitted by the source toward the detector actually reaches the detector. With this absorber element, an appropriate control in the surface circuits may be adjusted to provide a standard indication and the system be thereby calibrated.

The method and apparatus of a preferred embodiment of the invention will now be more fully described in conjunction with drawings attached hereto.

Figure 3:
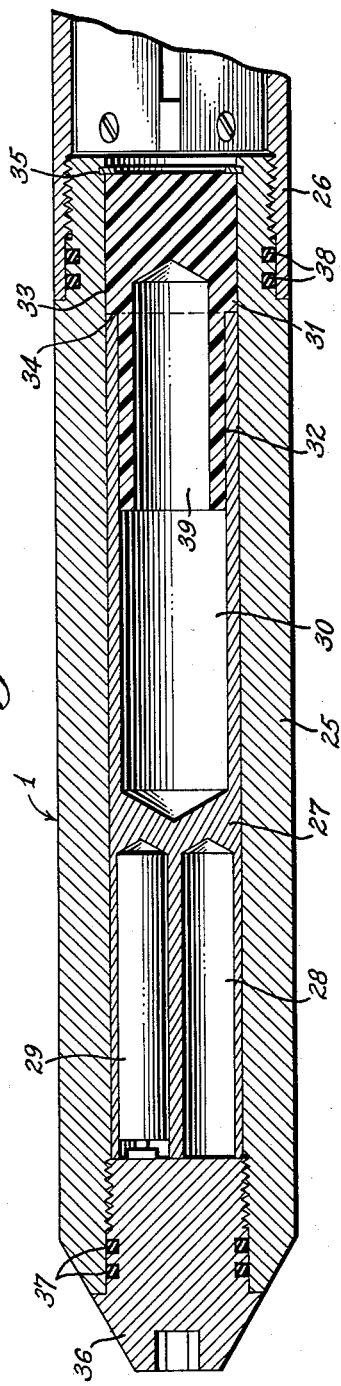
Figure 4:
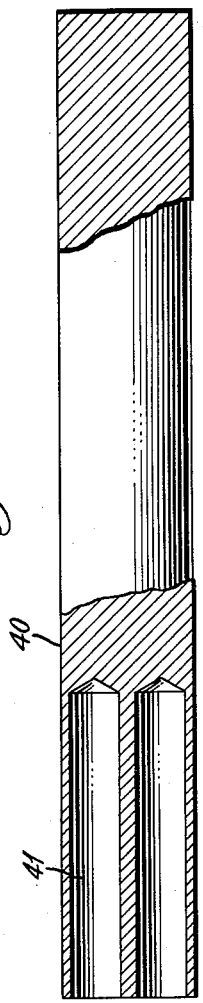

FIG. 3 is a longitudinal sectional view of a portion of the logging sonde, with the radiation absorber calibration elements of the invention in place therein FIG. 4 is a longitudinal sectional view of the radiation-absorbing operation insert used during logging operations; and, FIG. 5 is a graph showing the variation in absorption characteristics of the plastic plug of the invention with change in different dimensions thereof.

Figure 1:
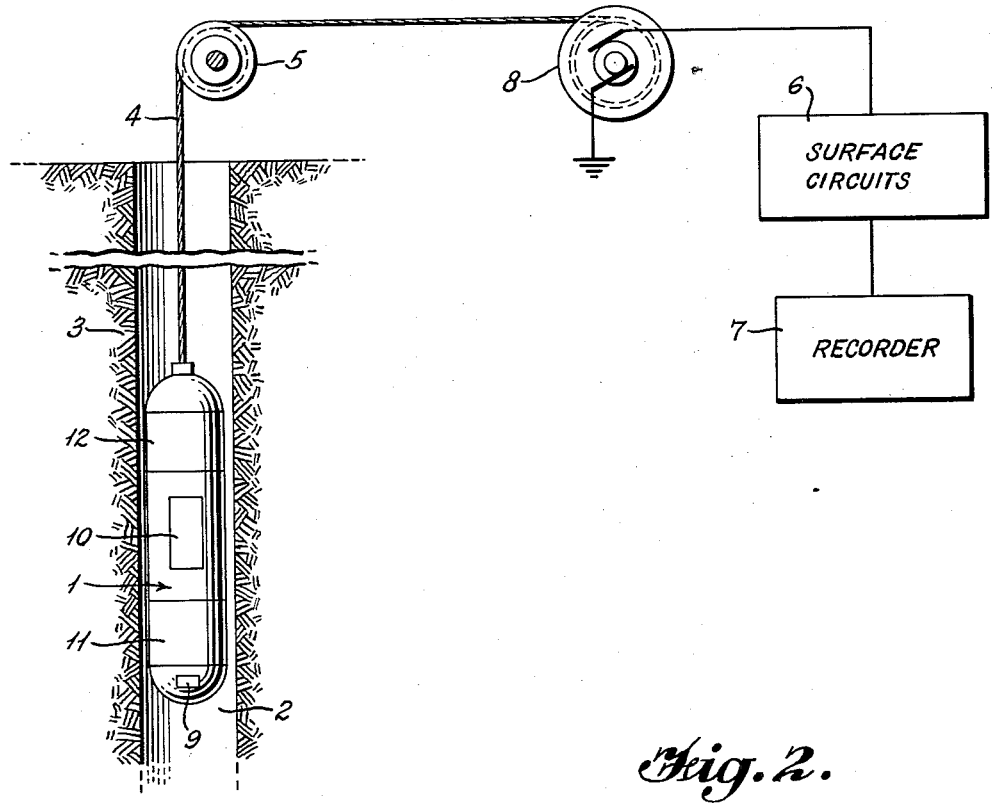
FIG. 1 is a diagrammatic view of a conventional neutron well logging apparatus.

Referring first to FIG. 1, a logging sonde 1 is shown in position within a borehole 2 to log the characteristics of the formations 3 surrounding the borehole. The sonde is supported by a cable 4 from the usual winch 5 which is normally arranged to be carried by a logging truck and driven by appropriate external means (not shown). It is conventional to employ the cable 4 for transmission of the detector signal from the sonde to the surface circuits 6 and recorder 7. Connection from the cable to the surface circuits is normally achieved through a drum diagrammatically shown at 8.

The logging sonde includes a neutron source 9 which may be of any desirable type, such as one or more polonium-beryllium capsules. Radiations passing directly from the source are prevented from appreciably affecting the neutron detector 10 by a suitable radiation shield 11. The detector 10 may be of any suitable type, such as a "Geiger-Müller tube, a scintillation detector, etc. Further, the detector may respond to neutrons returned to the sonde from the formations, or it may as well respond to gamma rays emitted from the formations as the result of neutron bombardment from the source. The term "neutron detector" will be used herein to refer to both types of detectors.

The output of the detector 10 is customarily amplified and shaped in various sonde circuits shown diagrammatically at 12, before transmission on cable 4 to surface circuits 6.

The signal from the neutron detector 10, as amplified and shaped by circuits 12, consists of a series of random pulses. In order that these pulses may be employed to indicate the intensity of the radiations striking the neutron detector, it is customary to amplify the detecor pulses, then to discriminate against pulses of amplitudes less than a desired set amount, and then to develop a D.C. voltage of amplitude indicative of the frequency of the pulses passing through the discriminator, which voltage is employed to actuate the recorder.

Figure 2:
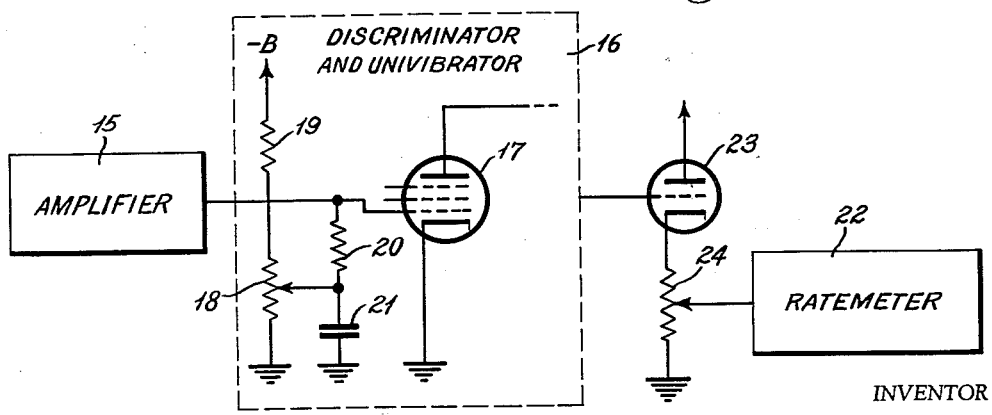
FIG. 2 is a schematic diagram of a portion of the surface circuits of the logging apparatus of FIG. 1.

The surface circuits 6 are shown more fully in FIG. 2 and include an amplifier 15 to which the detector signal from the cable 4 is supplied. After amplification, the random pulses of varying amplitude are delivered to discriminator and univibrator 16 which may contain a pentode tube 17 to whose control grid the amplifier output is supplied. The grid of the pentode is negatively biased to a suitable level determined by potentiometer 18 connected in series with a resistor 19 between ground and a suitable negative bias voltage source (not shown). The movable contact of the potentiometer is connected to the junction between grid resistor 20 and A.C. bypass capacitor 21. Thereby, the position of the movable contact of potentiometer 18 determines the bias level of the pentode and therefore the minimum amplitude of positive pulses from amplifier 15 which will pass through the discriminator.

The remainder of the discriminator may be of any conventional and well-known type and will not be more fully described. The output of the discriminator is supplied to the univibrator section of the apparatus indicated at 16. This section is not shown because it may be of well-known type known in the art which develops a square wave pulse of voltage for each pulse reaching it. The discriminator output therefore becomes a constant-amplitude, varying pulse-rate square wave voltage.

The output of the univibrator section of apparatus 16 is supplied to ratemeter 22 through a cathode follower 23 having a potentiometer 24 connected as its cathode resistor. The tap or movable contact of the potentiometer is connected to the ratemeter, which may be of well-known and conventional type. The usual ratemeter employed in well logging apparatus operates to develop a D.C. voltage of amplitude varying with the pulse rate reaching it. This varying D.C. voltage is then supplied to the recorder 7 to control the position of the recording element.

The gain control of potentiometer 24 is employed to select the deflection of the recorder element for any given input voltage. In other words, the gain control determines the amplitude of the pulses which are fed to the ratemeter circuit from the univibrator.

Referring next to FIG. 3 showing a portion of the logging sonde 1 in more detail, the sonde includes a lower (when the apparatus is in use) cylindrical sleeve or casing 25 which houses the source and radiation shield, and which is threadedly engaged with an upper cylindrical sleeve or casing 26, which houses the radiation detector 10 (not shown in FIG. 3). The sonde, as shown in FIG. 3, is ready for calibration and has a calibration insert 27 of cylindrical form inserted in a longitudinally-extending compartment defined by the inner wall of the casing 25. The calibration insert 27 is cylindrical in shape to fit that chamber closely and has a number of axially-extending chambers 28 at its left-hand end, as shown in FIG. 3, to receive neutron source capsules, such as shown at 29 in the figure. The calibration insert also has another chamber 30 extending from its opposite end toward the capsule-carrying chambers 28 and nearly to these chambers. The chamber 30 may be formed by drilling a bore in a piece of cylindrical solid steel.

A plug 31 of radiation-absorbing material, such as a plastic, is assembled with the calibration insert 27. The plug may be made of, for instance, a suitable phenolic plastic, which, as is well known, absorbs neutrons impinging upon it.

The plastic plug 31 is cylindrical in shape and has a portion 32 of reduced outer diameter corresponding with the inner diameter of chamber 30 in the calibration insert so that this portion of the plug may fit into chamber 30. The remainder of the plug, indicated at 33, has an outer diameter identical with that of the calibration insert 27 and is separated from the portion 32 by a shoulder 34 which abuts the end of the calibration insert. As shown, the plastic plug 31 forms an extension of the calibration insert. The assembly of the plug and insert is held in position at one end by a suitable retaining ring 35 fitting into a slot in the inner wall of casing 25. The other end of the assembly, and the neutron source capsule or capsules, are held in place by a source sub plug 36 which is threadedly engaged with the inner wall of casing 25.

In order that the source assembly may be sealed against ingress of moisture and other materials, the source sub plug is provided with slots for sealing rings 37, while the casing 25 is similarly provided with slots at its other end for sealing rings 38.

The absorber plug 31 is employed as a control device to select the amount of absorption of radiation passing directly between the source capsule 29 and the detector 10. The plug is provided with a bore 39 extending axially from the end of the plug within chamber 30, which bore has a length determined by the amount of absorption desired. The effect of variation of the length of the bore, and of the length of the portion 32 of the plug, on the amount of absorption will subsequently be discussed.

FIG. 4 shows the operation insert 40 corresponding to the calibration insert 27. This operation insert is of the same diameter and the same length as the assembly of calibration insert 27 and absorber plug 31. The operation insert also has chambers 41 identical with the capsule-receiving chambers 28 of the calibration insert 27, and for the same purpose. However, the operation insert is otherwise solid in nature and is preferably made of a material, such as steel, which absorbs radiation tending to pass directly between the source and the detector.

In operation of the apparatus so far described, when the logging sonde is to be used for an actual logging operation, the calibration insert is removed from the apparatus and the operation insert 40 put in its place. One or more neutron source capsules 29 are then positioned in chambers 41, and the usual logging operations carried out.

When the apparatus is to be calibrated, the operation insert or shield 40 is replaced with the calibration insert 27 having the number of neutron source capsules 29 in place that will be actually used in the logging operation for which the apparatus is to be calibrated. An appropriate plastic absorber plug 31 is also in the position shown in FIG. 3.

With these calibration elements in position, the reading on the recorder, or an appropriate indicator connected to the ratemeter, is noted. The gain control potentiometer 24 is then adjusted in accordance with a determination of the neutron emission of the source 9 to correct for variations in the neutron emission from the standard value. For instance, full sensitivity of the ratemeter may be used for $10^7$ neutrons per second, and the sensitivity of the ratemeter may be proportionately reduced for emission levels above this value. The discrimination level is then adjusted by potentiometer 18 to obtain the predetermined standard ratemeter deflection. This latter step is performed to insure that the correct part of the radiation spectrum is being detected.

When the spectral region detected is determined solely by the properties of the detector, it is not necessary that the discrimination level be adjusted during calibration.

In such case, only the ratemeter gain control 24 will be adjusted to obtain the standard ratemeter deflection.

The well logging apparatus may be calibrated at more than one point, and preferably is calibrated at a plurality of points corresponding to levels anticipated in actual logging operations. For convenience in calibration at a number of different points, a number of plugs 31 of different absorption characteristics may be employed.

Referring to FIG. 5, the dimensions of an appropriate plastic plug for an actual logging sonde are shown in connection with a graph of the indicated counts per second received by the detector, plotted against the drill depth "D" of the bore 39 in the plastic plug. The values shown on the graph represent data collected in a well formation of known characteristics with plugs of different drill depths. It will be seen also that the chart illustrated contains three graphs corresponding to different lengths "L" of the portion 32 of the plug which fits within the chamber 30 of the calibration insert. Variation in this length also affects the absorption characteristics of the plug, as is evident from the curves.

It will be noted that all of the three graphs shown are approximately linear near the left-hand portion of the graph and become nonlinear as the drill depth increases beyond a certain level depending upon the length "L" of the portion 32 of the plug. This is a characteristic of the plastic plug which is very useful in calibration procedures.

As indicated at the beginning of this specification, a principal reason for calibration of neutron logging apparatus is for use in porosity determination. For such use, the instrument response in a given rock of known porosity can be determined by experiments under known conditions, such as in a test well, or in a field well in which cores have been taken. It is then possible to construct a calibration insert assembly containing the elements disclosed above that will produce the same response. The insert assembly then is equivalent to an artificial formation of known porosity to which the instrument can be standardized before operation.

Theoretically, it is possible to use only one such standard and to have one basis by which porosity can be determined from the neutron log. However, it is not possible to determine porosity from a log made with only one calibration point with great accuracy. When high accuracy is desired, it is necessary to establish a standard instrument response to porosity relationship for every formation in which porosity measurements are to be made. It is also necessary to correct for variation in hole conditions, such as change in pipe size, etc.

It is possible by empirical means to determine a calibration point for each important formation and hole condition that is to be encountered, so as to permit porosity determination on a uniform basis. Thereby, a given instrument response will always indicate the same porosity, providing the calibration has been made correctly for the formation in question. With easily interchangeable calibration inserts of different known absorption characteristics, it is possible to select any appropriate calibration point for the particular logging conditions anticipated.

It is therefore possible to use interchangeable calibrators for calibrating various standard points. However, it is also possible to use a single calibration point and to use an interpretation factor for each different type of formation, based on that single point.

It will be apparent that many of the elements of the apparatus described above are not in any way critical to the operation of this invention. The invention has been illustrated in conjunction with a well known type of logging system, but it could be as well used in other types of logging systems which include a neutron source, a radiation detector, and a shielding or absorber means between the two detectors to prevent direct radiation from appreciably affecting the detector.

It is also evident that the particular circuitry described, and specifically the discriminator and gain control potentiometer, are not at all essential to the operation of this invention. Other controls could as well be used, as long as a control is available to adjust the ratemeter voltage output to a desired standard determined by the calibration insert and plug employed.

It will be understood that the method and apparatus described herein may be varied, particularly in minor detail, without departure from the scope of the invention. Therefore the invention is not to be considered limited to the particular embodiment described, but rather only by the scope of the appended claims.

I claim:

1. The method of calibrating well logging apparatus having a neutron source of penetrating radiation and a radiation detector arranged to define two radiation paths therebetween, one of said paths being an operational test path and the other of said paths being substantially totally inoperative for radiation transmission, comprising maintaining said operational test path substantially inoperative to transmit radiation, rendering the other path fractionally radiation conductive in a predetermined degree simulating a standard operational test path condition, indicating detector response as that corresponding to the simulated operational test path condition and then substantially terminating radiation transmission in said other path.

2. The method of calibrating well logging apparatus having a neutron source of penetrating radiation and a radiation detector arranged to provide a direct radiation path therebetween substantially totally inoperative for radiation transmission, and an indirect operational test radiation path therebetween for testing formations, comprising maintaining the indirect operational test path substantially inoperative to transmit radiation, rendering the direct path fractionally radiation conductive in a predetermined degree simulating a standard operational test path condition, and indicating detector response as that corresponding to the simulated operational test path condition.

3. The method defined in claim 2 further including the step of substantially terminating radiation transmission through said direct path.

4. In a penetrative radiation well logging system of the type comprising an elongated sonde, a neutron source positioned in said sonde, a detector for radiation impinging laterally of the sonde due to neutron bombardment of the formations to be logged positioned in said sonde and spaced longitudinally thereof from the source at a predetermined distance used in logging, and absorber means removably positioned in said sonde between the source and detector operative to transmit radiation longitudinally from the source direct to the detector with predetermined fractional attenuation to simulate laterally impinging radiation from a standard formation in the substantial absence of direct longitudinal radiation from the source.

5. The apparatus of claim 4 in which the absorber means comprises a plastic body.

6. The apparatus of claim 4 further comprising adjustable means for quantitatively indicating detector response to radiation.

7. In a penetrative radiation well logging system of the type comprising an elongated sonde, a neutron source positioned in said sonde, a detector for radiation impinging laterally of the sonde due to neutron bombardment of the formations to be logged positioned in the sonde and spaced longitudinally thereof from the source, a longitudinally extended chamber in the sonde between the source and detector, a radiation shield removably positioned in said chamber operative to absorb direct longitudinal radiation therethrough substantially completely and radiation transmitting means receivable in said chamber in the absence of the radiation shield operative to transmit radiation longitudinally from the source direct to the detector with predetermined fractional attenuation to simulate laterally impinging radiation from a standard formation in the substantial absence of longitudinal radiation from the source.

8. The apparatus of claim 7 in which the radiation transmitting means comprises a plastic body.

9. The apparatus of claim 7 further comprising adjustable means for quantitatively indicating detector response to radiation.

References Cited in the file of this patent

UNITED STATES PATENTS

| | | |
|---|---|---|
| 2,469,461 | Russell | May 10, 1949 |
| 2,540,261 | Herzog | Feb. 6, 1951 |
| 2,543,675 | Swift | Feb. 27, 1951 |
| 2,781,453 | Belcher et al. | Feb. 12, 1957 |
| 2,816,235 | Scherbatskoy | Dec. 10, 1957 |
| 2,945,129 | Swift et al. | July 12, 1960 |

OTHER REFERENCES

Nuclear Geology, 1954; page 224.